US006590184B1

(12) United States Patent
Andersen

(10) Patent No.: US 6,590,184 B1
(45) Date of Patent: Jul. 8, 2003

(54) RACK ASSEMBLY SUPPORT FOR WELDING MACHINE

(75) Inventor: Bryan P. Andersen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/063,820

(22) Filed: May 15, 2002

(51) Int. Cl.[7] .............................. B23K 9/32; B62D 43/00
(52) U.S. Cl. ....................................... 219/136; 414/466
(58) Field of Search ............................. 219/136, 130.1; 414/466, 469, 470

(56) References Cited

U.S. PATENT DOCUMENTS

| 4,676,415 A | * | 6/1987 | Kennedy ................... 224/489 |
| 5,440,098 A | * | 8/1995 | Matus ......................... 219/136 |
| 5,730,891 A | * | 3/1998 | Karpoff et al. ............. 219/136 |
| 5,957,346 A | * | 9/1999 | Schambre et al. ........ 224/42.21 |
| 5,993,133 A | * | 11/1999 | Murray et al. ............... 414/463 |
| 6,315,186 B1 | * | 11/2001 | Friedl et al. ................ 228/102 |

OTHER PUBLICATIONS

Miller Electric Mfg. Co., Owner's Manual for Syncrowave 180 SD, 2002.

* cited by examiner

Primary Examiner—Tom Dunn
Assistant Examiner—Len Tran
(74) Attorney, Agent, or Firm—Ziolkowski Patent Solutions Group, LLC

(57) ABSTRACT

A welding machine includes a housing having a base and a slidable rack assembly to support a gas cylinder. The rack assembly is slidably coupled to the base of the housing to move between open and closed positions. In a closed position, the rack assembly is concealed underneath the housing and in the open position the rack assembly is extended outwardly from the base to support the gas cylinder. A plurality of wheels is provided to support transportability of the welding machine.

21 Claims, 3 Drawing Sheets

RACK ASSEMBLY SUPPORT FOR WELDING MACHINE

BACKGROUND OF INVENTION

The present invention relates generally to welding machines and, more particularly, to a welding machine that incorporates a rack assembly to support a gas cylinder.

There are a large number of welding processes available for use in industry. The most common welding processes include gas tungsten arc, oxygen gas welding, and shielded metal arc welding. The gas tungsten arc welding process is sometimes referred to as TIG (tungsten inert gas) welding. TIG welding is commonly performed by a TIG welding machine utilizing an inert gas and a tungsten electrode.

A typical portable TIG welding machine includes a wound transformer and stabilizer that together with various electrical components condition current to be suitable for welding. The wound transformer, stabilizer, and electrical components are usually assembled into an enclosure having wheels for portability. The running gear enables the TIG welding machine to be transported to different jobs.

TIG welding machines carry one or more large cylinders of inert arc-shielding gases on the running gear. The gas cylinders are very heavy, often weighing as much as 180 pounds. The gas cylinders are normally supported on a horizontal pan or rack on the back end of the welding machine. The rack is welded to the running gear and is located a few inches above the floor. In that manner, the welding machine and the gas cylinders are transportable together by the running gear.

However, TIG welding machines are not necessarily limited to welding operations requiring gas. That is, a TIG welder may double as a stick welding machine wherein it is not necessary to carry a gas cylinder along with the welding machine. Therefore, a disadvantage of the existing horizontal racks is that it requires a great deal of space even when a cylinder is not required. Further, in some applications where such a welding machine is used for TIG welding, an alternate gas supply may be provided within a facility. For example, in some factories, gas is supplied through a conduit to various manifolds to supply gas for such welding machines. In these instances, it is not necessary to carry a gas cylinder with the welding machine.

In view of the aforementioned, it would be desirable to improve the design of such a welding machine and the gas cylinder rack to reduce space requirements when the welding machine is used for purposes that do not require transportation of a gas cylinder.

BRIEF DESCRIPTION OF INVENTION

The present invention solves the aforementioned problems by providing an improved rack assembly that is slidably coupled to the welding machine to allow retraction into a closed position.

Accordingly, one aspect of the present invention includes a welding machine having a housing, a welding power supply disposed within the housing and configured to deliver electrical power to weld metal. A rack assembly is provided that is retractably positioned within the housing to support a gas cylinder when in an extended position.

In accordance with another aspect of the present invention, a welding apparatus having a housing including a base and plurality of panels extending upwardly from the base and a top cover coupled to the plurality of panels to form an enclosure is provided. A welding power supply configured to deliver electrical power at levels sufficient to weld metal is disposed within the enclosure. The welding apparatus further includes a retractable cylinder support slidably coupled to the base of the housing and configured to support a gas cylinder when in a non-retracted position. The retractable cylinder support includes a base plate and a plurality of rails affixed to the base plate, wherein each of the plurality of rails includes a longitudinal slot configured to restrict extension of the rack assembly. The cylinder support further includes a pair of wheels coupled to an end of the base plate to support transportability of the welding apparatus.

In accordance with yet another aspect of the present invention, a method of providing support for a gas cylinder of a transportable welding machine includes the step of providing a welding machine having a housing and an extendable rack assembly. The method further includes extending the rack assembly with respect to the housing to expose a portion of a base plate and placing a gas cylinder on the portion of the base plate.

In accordance with yet another aspect of the present invention, a rack assembly kit to retrofit a welding apparatus to support a gas cylinder is provided. The rack assembly kit includes a cylinder support plate slidably extendable from a base of a welding apparatus and configured to support a gas cylinder when in an extended position and retract with respect to the base when in a retracted position. The kit further includes at least a pair of wheels affixed to the cylinder support plate to provide transportability of the gas cylinder.

Various other features, objects and advantages of the present invention will be made apparent from the following detailed description and the drawings.

BRIEF DESCRIPTION OF DRAWINGS

The drawings illustrated the best mode presently contemplated for carrying out the invention.

In the drawings.

DETAILED DESCRIPTION

Figure 1:
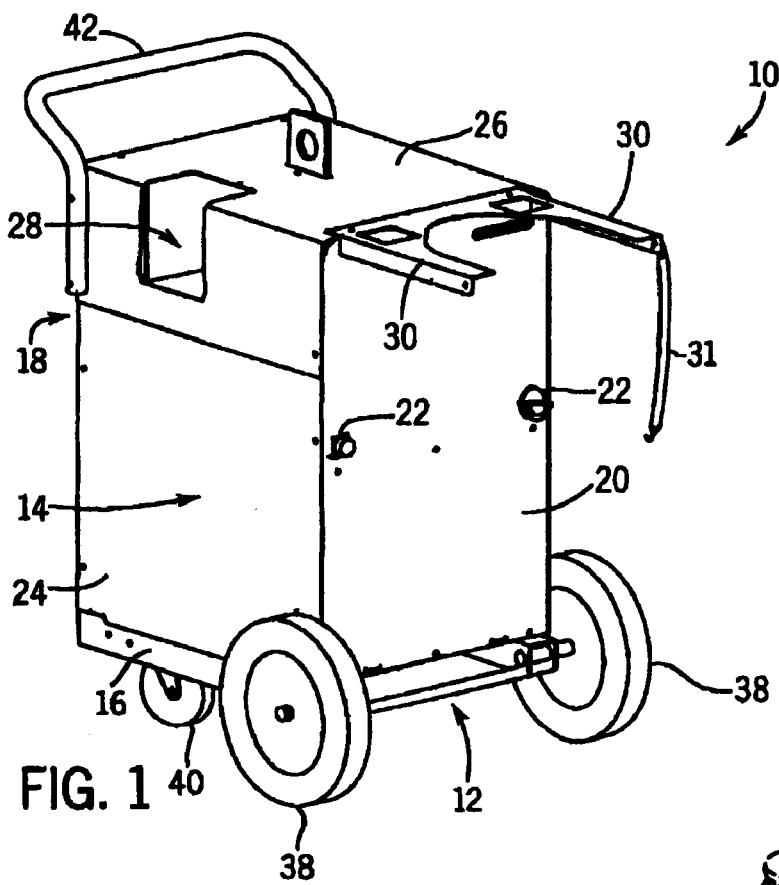
FIG. 1 is a perspective view of a welding machine incorporating a rack assembly constructed in accordance with the present invention and illustrating the rack assembly thereof in its closed position.

FIG. 1 is a perspective view of a welding machine 10, incorporating a retractable rack assembly 12. The welding machine 10 comprises a housing 14 having a base 16, and a plurality of panels spaced apart from one another and extending upwardly from the base 16. The plurality of panels includes a back panel 18, a front panel 20 with control knobs 22 and a pair of side panels 24. A top cover 26 is secured to the panels that collectively form an enclosure. The top cover 26 has an opening 28 to allow access to the interior of the housing 14. Panels 20, 24 and top cover 26 are preferably fabricated from blank sheet metal as is well known in the art. A pair of support bars 30 extend outwardly from housing 14 to support an upper portion 32 of a gas cylinder 34 as best shown in FIG. 2.

Enclosed in the housing 14 is a welding power supply (not shown) as well as a prime mover such as an engine (not shown) to drive a generator. Electrical power from the generator is converted by various electrical components into power suitable for welding, as is well known in the art.

A rack assembly 12 is slidably coupled to the base 16 of the housing 14 to allow retraction of the rack assembly 12 into a closed position. In the closed position, rack assembly 12 is engaged with base 16 of housing 14. A locking device, preferably a pair of pins 36a and 36b, couples the rack assembly to the base on both sides of the housing. Self-tapping screws may also be used to couple the rack assembly to the base. Wheels 38, 40 and handle 42 enables the welding machine 10 to be maneuvered and transported with ease to different job sites. Further, each wheel 38 is equipped with a wheel-locking mechanism 39 to limit the transportability of the welding machine. Wheel 40 is coupled to an undersurface of the base 16 and is configured to freely pivot to assist with turning of the welding machine.

Figure 2:
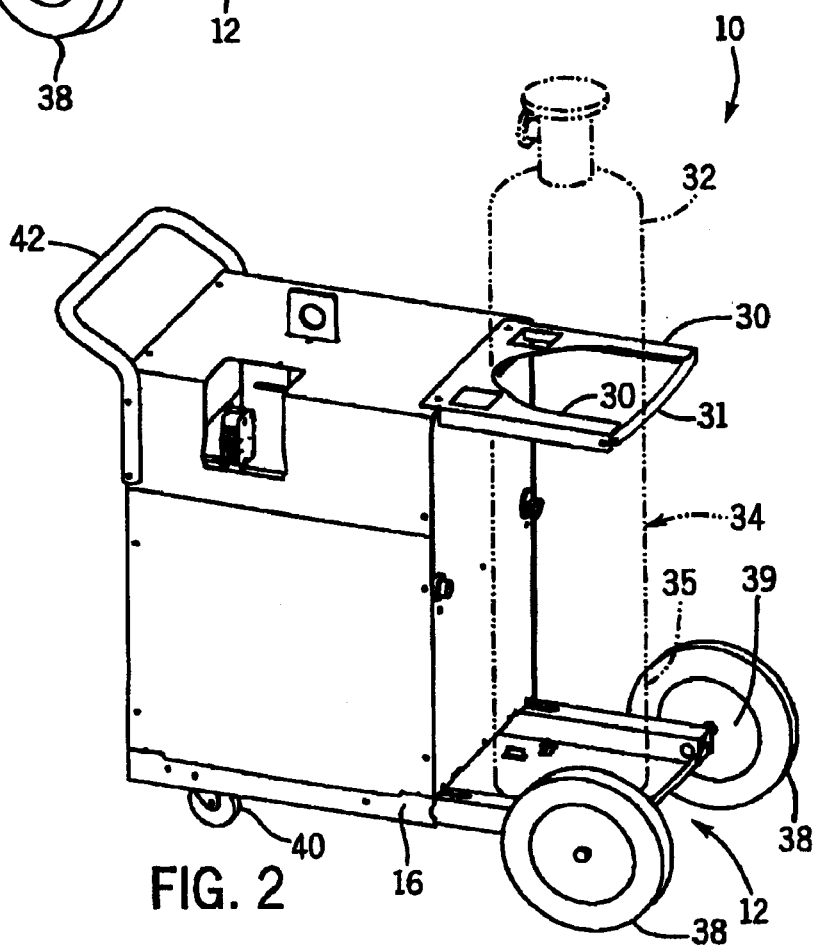
FIG. 2 is a perspective view, similar to FIG. 1, illustrating the rack assembly in an open position and supporting a gas cylinder shown in phantom.

FIG. 2 is a perspective view similar to FIG. 1 illustrating the rack assembly 12 in an open or disengaged position and supporting a gas cylinder 34 shown in phantom. In an open or retracted position, rack assembly 12 is extended outward away from the base 16 and is configured to support the gas cylinder 34 for supplying shielding gas during welding operation.

Figure 3:
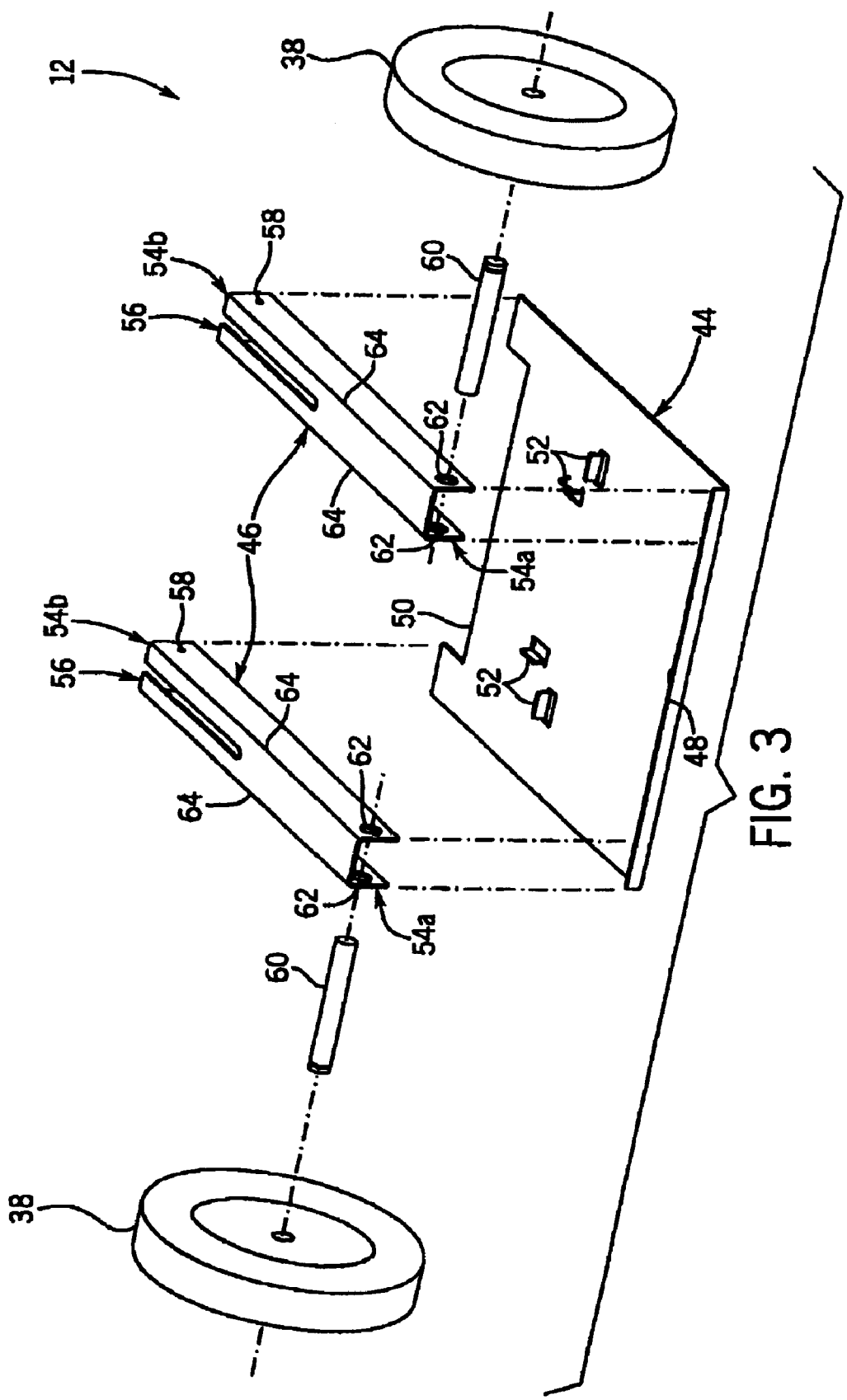
FIG. 3 is an exploded perspective view of the rack assembly of FIGS. 1 and 2.

FIG. 3 is an exploded view of the rack assembly 12 of FIGS. 1 and 2. The rack assembly 12 has a base plate 44 and a plurality of rails 46 which are spaced apart and fixed to the base plate 44. Preferably the base plate 44 is fabricated from sheet metal and has two opposed ends, an upwardly standing lip 48 at one end and a U-shaped channel 50 at the other end. Lip 48 is formed by bending upward one end of the base plate 44 in a general right angle and thereby operates to assist in preventing the gas cylinder 34 from slipping off the base plate. Similarly, a plurality of guides 52 are formed within the base plate 44 and extend upwardly from the base plate. The guides 52 are configured to support a lower portion 35 of the gas cylinder.

Still referring to FIG. 3, each rail 46 has a first end 54a and a second end 54b. The second end 54b of each rail has a longitudinal slot 56 that engages a rod (not shown) of the base 16. The rail is disposed within the slot 56 to limit the retractable range of base plate 44. Slot 56 and holes 58, 62 may be formed by properly cutting the middle of a rectangular sheet metal and punching holes 58, 62 on each end of the sheet metal. The sheet metal may then be bent downwardly along fold lines 64 and welded to the base plate 44. However, other construction techniques are contemplated and within the scope of the present invention. The first end 54a of each rail has also two holes 58 which are axially aligned with a hole on a side of base 16 of the housing and then a pin 36a is inserted therethrough to fasten the rack assembly.

Figure 4:
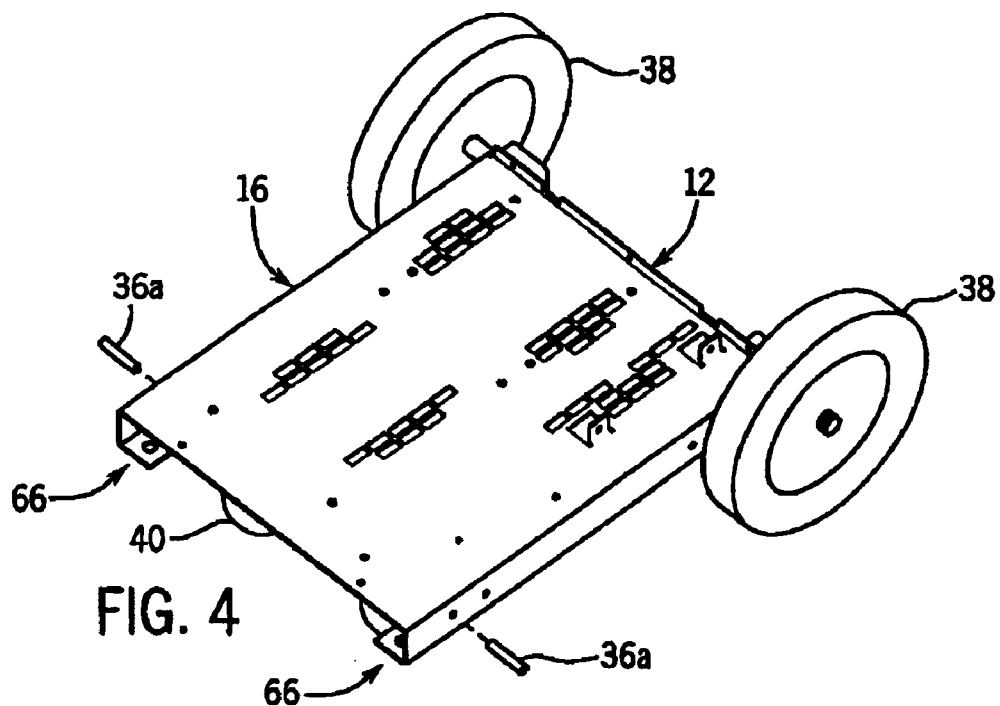
FIG. 4 is an assembled top perspective view of the rack assembly of FIG. 3 in a closed position.
Figure 5:
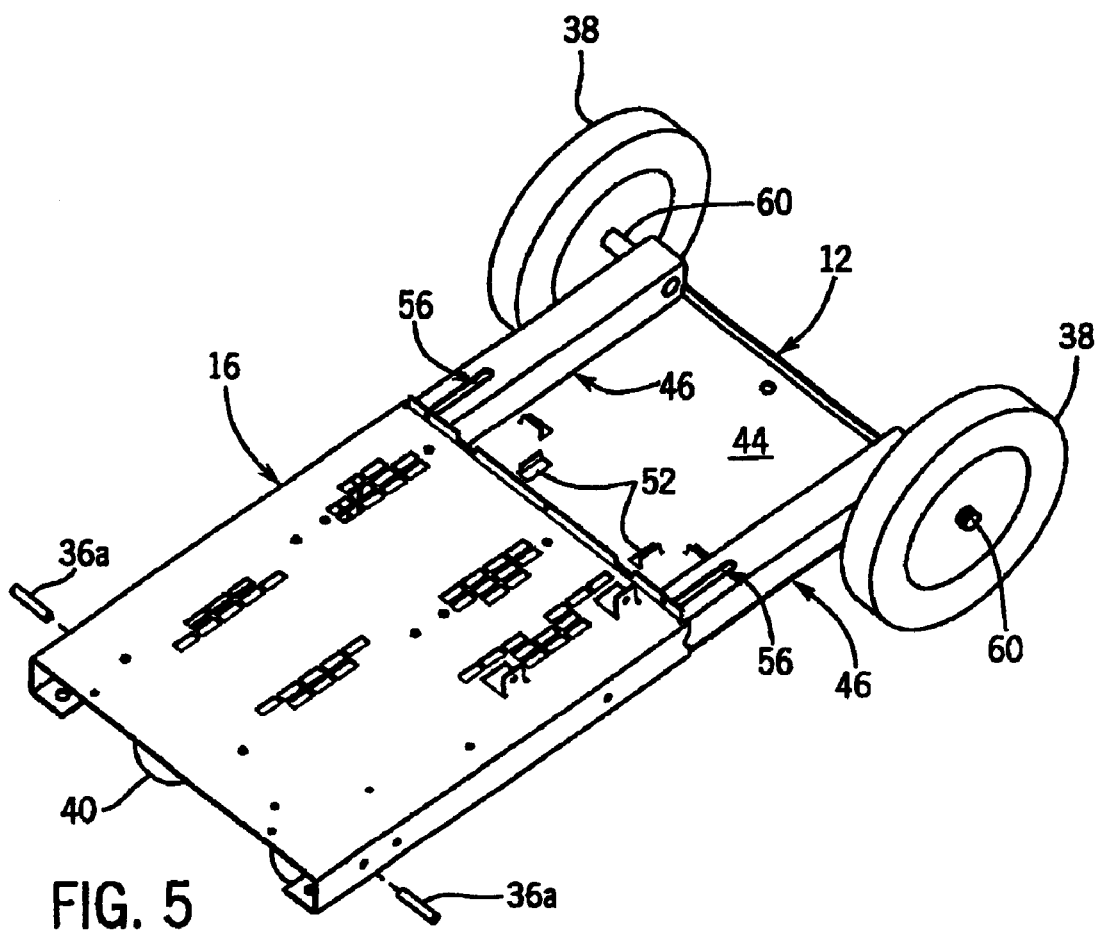
FIG. 5 is similar to FIG. 4 and illustrates the rack assembly in an open position.

At least one axle, and preferably two identical axles 60, are attached to corresponding first ends 54a of the two rails 46. Each wheel 38 is mounted on an axle 60 that is inserted through a pair of holes 62 and securely fastened to the rail by a cotter pin and a washer, or other securing means. Referring now to FIG. 4, an assembled top perspective view rack assembly 12 in a closed position is shown. As described above, when the rack assembly is constructed and assembled, slots 56 engage with corresponding grooves 66 of base 16. The length of slot 56 together with a rod limit the extendable distance the rack assembly 12 may travel FIG. 5 is similar to FIG. 4 and illustrates the rack assembly 12 in an open position. As shown, rack assembly 12 may be extended to expose a portion of the base plate 44 such that gas cylinder 34 may be supported thereon. Additionally, rack assembly 12 is constructed such that the welding machine may be transported while the gas cylinder is being supported. To provide additional security, a strap 31 fastened to support bars 30, FIG. 1, may be implemented to limit transverse movement of the gas cylinder.

Accordingly, one embodiment of the present invention includes a welding machine having a housing, a welding power supply disposed within the housing and configured to deliver electrical power to weld metal. A rack assembly is provided that is retractably positioned within the housing to support a gas cylinder when in an extended position.

In accordance with another embodiment of the present invention, a welding apparatus having a housing including a base and plurality of panels extending upwardly from the base and a top cover coupled to the plurality of panels to form an enclosure is provided. A welding power supply configured to deliver electrical power at levels sufficient to weld metal is disposed within the enclosure. The welding apparatus further includes a retractable cylinder support slidably coupled to the base of the housing and configured to support a gas cylinder when in a non-retracted position. The retractable cylinder support includes a base plate and a plurality of rails affixed to the base plate, wherein each of the plurality of rails includes a longitudinal slot configured to restrict extension of the rack assembly. The cylinder support further includes a pair of wheels coupled to an end of the base plate to support transportability of the welding apparatus.

In accordance with yet another embodiment of the present invention, a method of providing support for a gas cylinder of a transportable welding machine includes the step of providing a welding machine having a housing and an extendable rack assembly. The method further includes extending the rack assembly with respect to the housing to expose a portion of a base plate and placing a gas cylinder on the portion of the base plate.

In accordance with yet another embodiment of the present invention, a rack assembly kit to retrofit a welding apparatus to support a gas cylinder is provided. The rack assembly kit includes a cylinder support plate slidably extendable from a base of a welding apparatus and configured to support a gas cylinder when in an extended position and retract with respect to the base when in a retracted position. The kit further includes at least a pair of wheels affixed to the cylinder support plate to provide transportability of the gas cylinder.

The present invention has been described in terms of the preferred embodiment, and it is recognized that the equivalent, alternatives, and modifications, aside from those expressly stated, are possible and within the scope of the appending claims.

What is claimed is:

1. A welding machine comprising:
  a housing;
  a welding power supply disposed inside the housing and configured to deliver electrical power at levels sufficient to weld metal; and
  a rack assembly retractably positioned relative to the housing wherein the rack assembly is configured to support a gas cylinder when in an extended position, wherein the rack assembly comprises a base plate; and
plurality of rails spaced apart and fixed to the based plate.

2. The welding machine of claim 1 wherein each of the plurality of rails has a slot defining a range of extension.

3. The welding machine of claim 2 wherein the rack assembly further comprises a pair of wheels coupled to the base plate to enable transportability of the welding machine.

4. The welding machine of claim 1 wherein the base plate further includes an upwardly extending lip at one end and a U-shaped channel at an opposite end.

5. The welding machine of claim 2 further comprising a plurality of guides extending upwardly from the base plate and configured to support a lower portion of the gas cylinder.

6. The welding machine of claim 1 further comprising at least one pivotable wheel coupled to an under carriage of the housing.

7. The welding machine of claim 1 further comprising a pair of support bars extending outwardly from the housing to support an upper portion of the gas cylinder.

8. The welding machine of claim 1 further comprising a locking device configured to couple the rack assembly to the housing.

9. A welding apparatus comprising:
a housing having a base and a plurality of panels extending upwardly from the base and a top cover coupled to the plurality of panels to form an enclosure;
a welding power supply configured to deliver electrical power at levels sufficient to weld metal, the power supply being disposed within the enclosure; and
a retractable cylinder support slidably coupled to the base of the housing and configured to support a gas cylinder when in a non-retracted position, the retractable cylinder support including:
a base plate,
a plurality of rails fixed to the base plate, wherein each of the plurality of rails includes a longitudinal slot configured to restrict extension of the rack assembly; and
a pair of wheels coupled to an end of the base plate to support transportability of the welding apparatus.

10. The welding apparatus of claim 8 wherein the retractable cylinder support engages the base of the housing when in a retracted position and is extended outwardly from the base when in the non-retracted position.

11. The welding apparatus of claim 10 further comprising at least one pivotable wheel centrally coupled to the base of the housing.

12. The welding apparatus of claim 9 further comprising a locking device configured to couple the retractable cylinder support to the base of the housing.

13. A method of providing support for a gas cylinder of a transportable welding machine comprising the steps of:
providing a welding machine having a housing and an extendable rack assembly;
extending the rack assembly with respect to the housing to expose a portion of a base plate; and
placing a gas cylinder on the portion of the base plate; wherein the housing includes a pair of rods, each rod engageable with a slot of the rack assembly and further comprising the step of extending the rack assembly to a fully open position by pulling the rack assembly outwardly from the housing until each rod abuts a termination end of a respective slot.

14. The method of claim 13 wherein the welding machine includes a plurality of wheels connected to the housing to support transportability of the welding machine.

15. The method of claim 13 further comprising the step of releasing a locking device to permit extension of the rack assembly to a cylinder supporting position.

16. The method of claim 13 further comprising the step of securing the gas cylinder between a pair of support bars extending from the housing to limit lateral motion of the gas cylinder.

17. The method of claim 16 further comprising the step of securing a strap to the pair of support bars to further secure the gas cylinder on the portion of the base plate.

18. The method of claim 13 further comprising the step of engaging at least one wheel-locking mechanism to limit transportability of the welding machine.

19. The method of claim 13 further comprising the step of transporting the welding machine with the gas cylinder supported by the rack assembly from one situs to another.

20. A rack assembly kit to retrofit a welding apparatus to support transportability of a gas cylinder, the kit comprising:
a cylinder support plate extendable from a base of a welding apparatus, the cylinder support plate configured to support a gas cylinder when in an extended position and configured to retract with respect to the base when in a retracted position; and
at least a pair of wheels affixed to the cylinder support plate to provide transportability of the welding apparatus.

21. The kit of claim 20 further comprising a pivotable wheel attachable to an undersurface of the base to further support transportability of the welding apparatus.

* * * * *